United States Patent
Maier et al.

(10) Patent No.: US 9,409,521 B2
(45) Date of Patent: Aug. 9, 2016

(54) PROTECTION DEVICE FOR A STORAGE SPACE OF A MOTOR VEHICLE AND DRIVE DEVICE THEREFOR

(71) Applicants: Matthias Maier, Esslingen (DE); Bernd Starzmann, Hohengehren (DE)

(72) Inventors: Matthias Maier, Esslingen (DE); Bernd Starzmann, Hohengehren (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/317,047

(22) Filed: Jun. 27, 2014

(65) Prior Publication Data
US 2015/0001874 A1    Jan. 1, 2015

(30) Foreign Application Priority Data

Jun. 28, 2013    (DE) .......................... 10 2013 212 574
Jun. 11, 2014    (DE) .......................... 10 2014 211 163

(51) Int. Cl.
    *B60R 5/04*          (2006.01)

(52) U.S. Cl.
     CPC ................. *B60R 5/047* (2013.01); *B60R 5/045* (2013.01)

(58) Field of Classification Search
     CPC .......... B60R 5/04; B60R 5/044; B60R 5/045; B60R 5/047; B60R 5/042; B60R 5/048; B60P 7/02
     USPC .......................... 296/24.43, 24.44, 37.1, 37.8, 296/37.14–37.16, 98
See application file for complete search history.

(56) References Cited

U.S. PATENT DOCUMENTS

| | | | |
|---|---|---|---|
| 6,416,103 B1 | 7/2002 | Laudenbach et al. | |
| 6,908,139 B1 * | 6/2005 | Szieff | 296/100.03 |
| 7,673,921 B2 * | 3/2010 | Hirayama et al. | 296/37.16 |
| 7,891,729 B2 * | 2/2011 | Fujishima et al. | 296/218 |
| 8,172,295 B2 * | 5/2012 | Fischer et al. | 296/24.43 |
| 8,727,414 B2 * | 5/2014 | Staib | 296/24.43 |
| 2009/0096241 A1 * | 4/2009 | Miyajima et al. | 296/37.16 |
| 2014/0015271 A1 * | 1/2014 | Demma | 296/24.44 |
| 2015/0001874 A1 * | 1/2015 | Maier et al. | 296/37.16 |

FOREIGN PATENT DOCUMENTS

| | | |
|---|---|---|
| DE | 199 44 948 C1 | 5/2001 |
| DE | 10 2004 060 747 A1 | 7/2006 |
| FR | 2 982 553 A1 | 5/2013 |

OTHER PUBLICATIONS

German Examination Report issued in Appln. No. 10 2013 212 574.7 dated Mar. 14, 2014 (5 pages).

* cited by examiner

*Primary Examiner* — Gregory Blankenship
(74) *Attorney, Agent, or Firm* — Flynn, Thiel, Boutell & Tanis, P.C.

(57) ABSTRACT

Protection device for a storage space of a motor vehicle. Such a protection device having a cartridge housing, in which at least one flexible planar formation is supported so as to be able to be wound and unwound, wherein the cartridge housing is able to be positioned so as to be secured to the storage space in vehicle-side retention receiving members, wherein the retention receiving members can be displaced inside the storage space by means of a kinematic displacement system, is known. The kinematic displacement system has vehicle-side linear guides, which extend with a main direction component in the vertical direction of the vehicle and in which the retention receiving members are guided, and there is provided a storage-space-base-side recess in which the cartridge housing is arranged in a recessed manner in a rest position. Use in private motor vehicles.

15 Claims, 6 Drawing Sheets

PROTECTION DEVICE FOR A STORAGE SPACE OF A MOTOR VEHICLE AND DRIVE DEVICE THEREFOR

CROSS REFERENCE TO RELATED APPLICATIONS

This application claims the priorities of the German patent applications DE 102013212574.7 and DE 102014211163.3, and the disclosures of these applications are hereby incorporated into this application.

FIELD OF THE INVENTION

The invention relates to a protection device for a storage space of a motor vehicle, having a carrier arrangement in which at least one flexible planar formation is supported so as to be able to be wound and unwound, wherein the carrier arrangement is able to be positioned so as to be secured to the storage space in vehicle-side retention receiving members, wherein the retention receiving members can be displaced inside the storage space by means of a kinematic displacement system. The invention further relates to a drive device for such a protection device.

BACKGROUND OF THE INVENTION

Such a protection device is known from FR 29 82 553 A1. The known protection device is constructed as a storage space cover and has as a carrier arrangement a cartridge housing, in which a flexible covering tarpaulin is supported so as to be able to be wound and unwound. The covering tarpaulin can be pulled out in order to cover the storage space approximately in a horizontal manner at the height of a side wall bodywork member. The cartridge housing is secured in a non-releasable manner in vehicle-side retention receiving members which can be pivoted in a pivot lever kinematic system between an upper operating position and a lower rest position. The pivot lever kinematic system is supported at the vehicle side in the region of the opposing side walls of the storage space.

SUMMARY OF THE INVENTION

An object of the invention is to provide a protection device of the type mentioned in the introduction which enables space-saving displacement of the carrier arrangement within the storage space.

This object is achieved in that the kinematic displacement system has vehicle-side linear guides which extend with a main direction component in the vertical direction of the vehicle and in which the retention receiving members are guided, and in that there is provided a storage-space-base-side recess in which the carrier arrangement is arranged in a recessed manner in a rest position. The vehicle-side linear guides may be positioned directly behind a backrest arrangement of a bench type back seat. The linear guides preferably extend along or parallel with a backrest contour of the backrest arrangement. For a displacement of the carrier arrangement between an upper protection position and a lower rest position, therefore, only a small movement space is required within the storage space. As a result of the recessed arrangement of the carrier arrangement in the recess of the storage space base, the usable storage space volume in the rest position of the carrier arrangement is not impaired. The solution according to the invention is particularly advantageously suitable for a protection device in the form of a storage space cover, in which a flexible planar formation can be tensioned in an approximately horizontal manner in order to cover the storage space preferably at the height of a side wall bodywork member. Alternatively or in addition, there may be provided in the carrier arrangement a partition net which can be tensioned in an approximately vertical manner and which acts as a retention device for transported objects in the event of a vehicle impact in order to prevent the transported objects from being thrown out of the storage space into the vehicle interior passenger space adjoining towards the front. The carrier arrangement serves to support a winding shaft on which the flexible planar formation is retained so as to be able to be wound and unwound. The carrier arrangement may be constructed as an open frame structure or as a closed cartridge housing. The solution according to the invention is particularly advantageously suitable for use in passenger vehicles, in which a storage space merges in an open manner into a passenger space so that the passenger space and storage space together form a vehicle inner space. Such passenger vehicles are in particular combined passenger vehicles, off-road vehicles and SUVs, vans, large limousines and the like.

In an embodiment of the invention, the vehicle-side linear guides are provided in opposing side wall regions of the storage space and extend in particular between an upper end region on a side wall bodywork member and the recess at the storage space base side. The vehicle-side linear guides preferably extend parallel with a rear backrest contour of a backrest arrangement of a bench type rear seat in order to enable a lifting or lowering movement of the carrier arrangement along the path of the rear-side contour of the backrest arrangement in a particularly space-saving manner.

In another embodiment of the invention, a mechanical synchronization system is provided in order to displace the retention receiving members in the opposing vehicle-side linear guides in such a synchronous manner that the carrier arrangement, in particular the cartridge housing, can be raised or lowered with a horizontal orientation. It is thereby ensured that oblique positioning or tilting of the carrier arrangement during a lifting or lowering movement is prevented.

In another embodiment of the invention, the opposing vehicle-side linear guides extend parallel with each other and have in addition to the orientation in the vertical direction of the vehicle an inclination component in the longitudinal direction of the vehicle. This embodiment is advantageous if the linear guides extend parallel with the backrest contour of the backrest arrangement which defines a front-side delimitation of the storage space. This is because the rear contour of the backrest arrangement does not generally extend vertically in the vertical direction of the vehicle, but instead in an inclined manner with respect to the vertical at a specific angular value of preferably between 5 and 20 degrees in order to enable an ergonomically favorable seating position for passengers at the rear.

In another embodiment of the invention, the mechanical synchronization system has a single peripheral cable arrangement for a synchronous vertical displacement of both retention receiving members in the opposing linear guides. This is a particularly simple and functionally reliable embodiment. The cable arrangement has a single peripheral cable and a plurality of redirection rollers in the region of the opposing side wall bodywork members and below the storage space base. The cable preferably extends through the linear guides for the retention receiving members and is securely connected to both retention receiving members so as to transmit movement.

In another embodiment of the invention, a drive device is provided in order to raise or lower the carrier arrangement in the linear guides. According to a construction variant, the drive device may be operationally connected to the cable arrangement in order to achieve corresponding raising or lowering of the retention receiving members in the linear guides. The drive device preferably has an electric motor. In another construction variant of the drive device, in place of the cable arrangement, there are laid in the opposing vehicle-side linear guides drive transmission cables which are driven synchronously with respect to each other via a common drive motor and a toothed wheel gear. The drive transmission cables are preferably constructed as flexible shafts which are also referred to as threaded shafts. A displacement of the flexible shafts in the linear guides and consequently corresponding displacements of the retention receiving members are carried out by means of at least one drive pinion which cooperates with the flexible shafts and which is driven by the drive motor. The flexible shafts are connected to the retention receiving members by means of carriers.

In another embodiment of the invention, at least for the operating position of the carrier arrangement and the retention receiving members, there is provided a locking mechanism which secures the carrier arrangement relative to the side wall regions of the storage space so as to be secure in the event of a crash. The locking mechanism serves to secure the carrier arrangement to the opposing side wall regions in the event of a crash and thus to prevent the carrier arrangement from being thrown in an uncontrolled manner through the storage space or the passenger space.

In another embodiment of the invention, there is provided a control unit which controls the drive device and which, depending on a control of the drive device, brings about release or locking of the locking mechanism. If the drive device comprises an electric motor, the control unit is preferably constructed as an electronic control unit which controls both the locking mechanism and the drive device. The locking mechanism locks the retention receiving members or the carrier arrangement relative to the side wall regions of the storage space as soon as the carrier arrangement has reached its operating position, in which the flexible planar formation can be tensioned. A release of the locking mechanism is carried out when the cartridge housing is intended to be lowered from this operating position again in the direction of the rest position thereof.

In another embodiment of the invention, a cover is provided in order to close the storage-space-base-side recess in a manner flush with the base. As a result of the closure of the recess by the cover in a manner flush with the base, the usable storage base surface-area of the protection device is increased. Preferably, the storage-space-base-side recess is constructed in such a manner that, when the protection device is used as a storage space cover in addition to the carrier arrangement, a dimensionally stable contour portion which is secured at the front side to the flexible planar formation can also be lowered in the recess.

In another embodiment of the invention, the drive device comprises at least one electric motor and a mechanical drive transmission system which is operationally connected, on the one hand, to the at least one electric motor and, on the other hand, to the carrier arrangement. The mechanical drive transmission system is preferably operationally connected to corresponding retention receiving members for the carrier arrangement.

In another embodiment of the invention, the mechanical drive transmission system comprises at least one elongate flexible tensile and/or pressure strand. A corresponding tensile and/or pressure strand may be formed by a flexible shaft, by means of a pulling cable or belt, by means of a Bowden cable arrangement or the like. In place of a flexible tensile and/or pressure strand, the mechanical drive transmission system may also comprise at least one rack-and-pinion drive.

In another embodiment of the invention, the tensile and/or pressure strand is constructed as a peripherally closed annular strand. The annular strand is in particular constructed as a peripheral pulling cable or belt.

The invention also relates to a drive device for a protection device of the type described above, which comprises at least one electric motor and a mechanical drive transmission system, which is operationally connected to the at least one electric motor, on the one hand, and to the carrier arrangement, on the other hand. The drive device is preferably provided inside a storage space of the vehicle interior of the motor vehicle. Advantageously, the at least one electric motor is integrated in a side bodywork member of the storage space. Preferably, the mechanical drive transmission system is also arranged in a concealed manner so as to be at least largely non-visible behind corresponding vehicle interior trim components of the storage space.

BRIEF DESCRIPTION OF THE DRAWINGS

Other advantages and features of the invention will be appreciated from the claims and from the following description of preferred exemplary embodiments of the invention which are illustrated with reference to the drawings.

DETAILED DESCRIPTION

Figure 1:
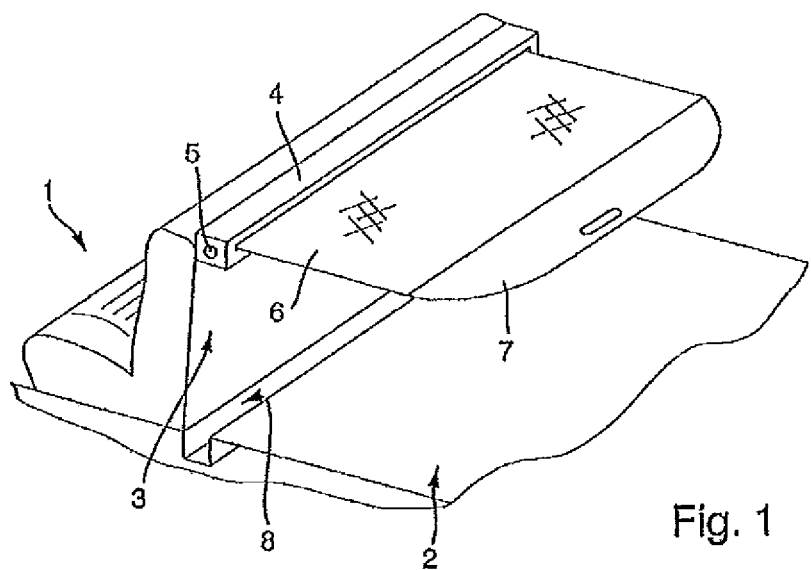
FIG. 1 is a schematic, isometric illustration of an embodiment of a protection device according to the invention in the form of a storage space cover.

A private motor vehicle has according to FIG. 1 a vehicle interior which is provided with a passenger space in a front region and with a storage space in a rear region. The passenger space comprises a bench type rear seat 1, whose backrest arrangement 3 forms a front-side delimitation for the storage space. The storage space has an approximately horizontal storage space base 2 which is delimited at the opposing longitudinal sides thereof by a side wall 10, respectively. The side walls 10 are provided approximately at the height of a vehicle waistline with a side wall bodywork member 11 which forms an upper termination of a side wall trim.

The storage space can be covered approximately at the height of the vehicle waistline and consequently approximately at the height of the opposing side wall bodywork member 11 by means of a covering tarpaulin 6 of a storage space cover. The covering tarpaulin 6 forms a flexible planar formation and has at the front end region thereof at the front in the deployment direction a dimensionally stable contour portion 7 which in the deployed protection position of the covering tarpaulin 6 terminates in a approximately flush manner with a rear-side delimitation of the storage space. The covering tarpaulin 6 is supported so as to be able to be wound and unwound on a winding shaft which is rotatably supported in a carrier arrangement in the form of a cartridge housing 4. The cartridge housing 4 extends over the width of the storage space and, in a protection position in which the covering tarpaulin 6 can be pulled out towards the rear at the height of the side wall bodywork member 11, is orientated horizontally in the transverse direction of the vehicle. The cartridge housing 4 directly adjoins a rear side of the backrest arrangement 3, as can be seen in FIG. 1. The cartridge housing 4 is provided at each of the opposing front end regions thereof with a retention element 5 by means of which the cartridge housing 4 can be fixed in vehicle-side retention receiving members 12.

Figure 2:
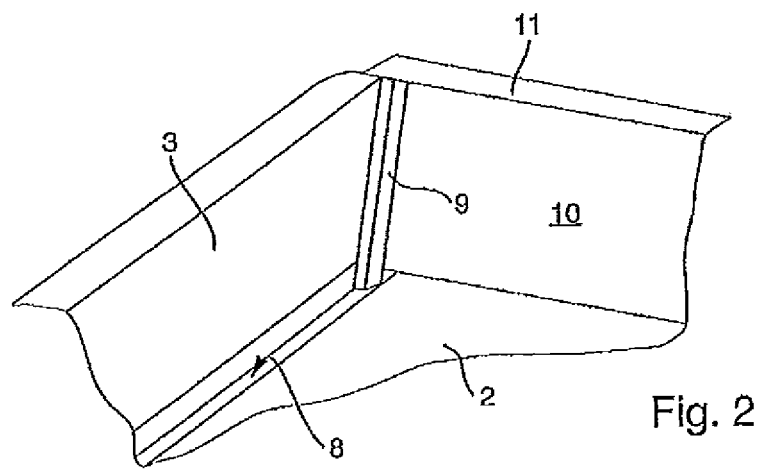
FIG. 2 is a schematic illustration of a linear guide of the protection device according to FIG. 1.
Figure 3:
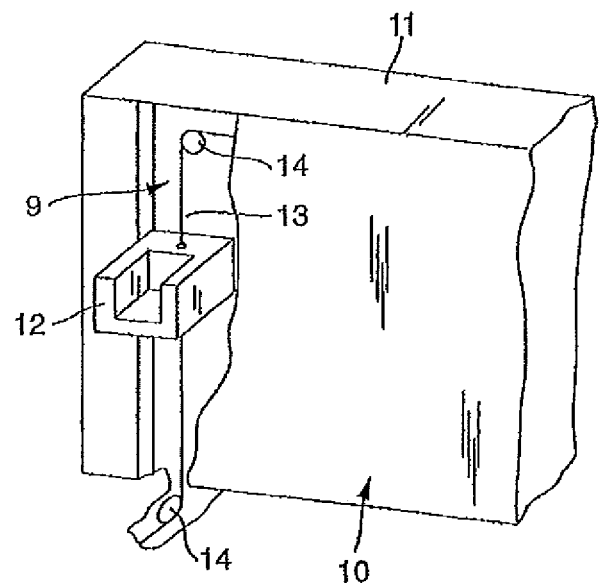
FIG. 3 is an enlarged schematic illustration of the arrangement of a retention receiving member for a cartridge housing of the protection device according to FIG. 1 in the linear guide according to FIG. 2.

The vehicle-side retention receiving members 12 are guided so as to be able to be moved in a linear manner in linear guides 9 which are integrated in the opposing side walls 10. The linear guides 9 extend downwards from the respective side wall bodywork member 11 and extend parallel with the rear side of the backrest arrangement 3, which rear side is inclined slightly towards the rear with respect to the vertical, directly adjacent to that rear side, as can be seen in FIG. 2. The linear guides 9 of the opposing side walls 10 are orientated parallel with each other and extend as far as a location in the storage space base 2 into a storage-space-base-side recess 8 which extends over the entire width of the storage space base in the transverse direction of the vehicle. The storage-space-base-side recess 8 is constructed in such a manner that the cartridge housing 4 can be completely lowered in the recess 8. Preferably, an upper side of the cartridge housing 4 terminates in a substantially flush manner with the storage space base 2 in the rest position thereof lowered in the recess 8. In order to be able to displace the retention receiving members 12 in the linear guides 9 in a longitudinally movable manner, that is to say, in order to be able to raise or lower them, according to FIGS. 3 and 4 there is arranged on both retention receiving members 12 a common peripheral cable 13 which is part of a cable arrangement 13, 14. The cable arrangement 13, 14 further comprises in addition to the peripheral cable 13 a plurality of cable rollers 14 which act as redirection rollers and which are supported in a stationary manner in the opposing side walls 10 and below the storage space base. The cable arrangement 13, 14 extends in both opposing side walls 10 and in the transverse direction of the vehicle below the storage space base 2. In this instance, a cable strand of the cable 13 is guided in the respective linear guide 9 and securely connected to the associated retention receiving member 12. The displacement of the cable arrangement 13, 14 is selected in such a manner that a synchronous lowering and raising of both retention receiving members 12 in the opposing side walls is carried out so that the cartridge housing 4 is displaced over its entire travel path upwards or downwards with a horizontal orientation. The cable arrangement 13, 14, together with the bearings of the retention receiving members 12 in the linear guides 9, is constructed so as to be self-locking so that the cartridge housing 4 can be pressed manually downwards or can be pushed manually upwards. In addition, it is possible, for the rest position of the cartridge housing 4 in the storage-space-base-side recess 8 and for the functional position at the height of the side wall bodywork members 11, to provide a manually releasable catch mechanism which secures the cartridge housing 4 in the corresponding upper and lower end positions.

Figure 4:
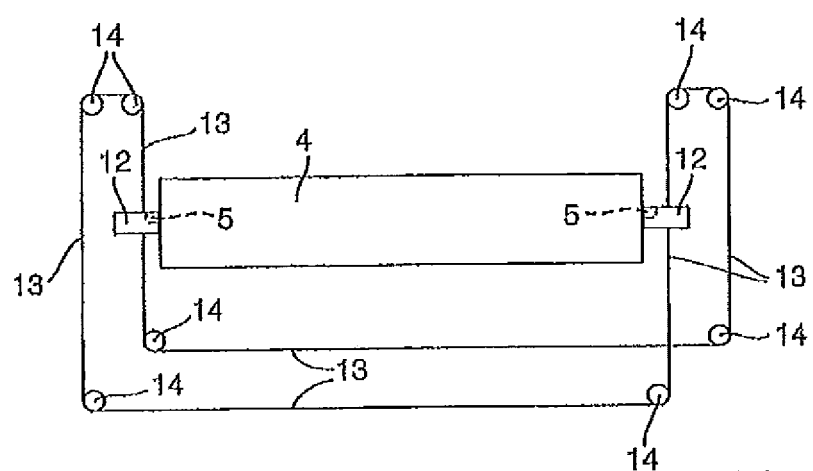
FIG. 4 is a schematic illustration of a cable arrangement for raising and lowering the cartridge housing according to FIGS. 1 to 3.
Figure 5:
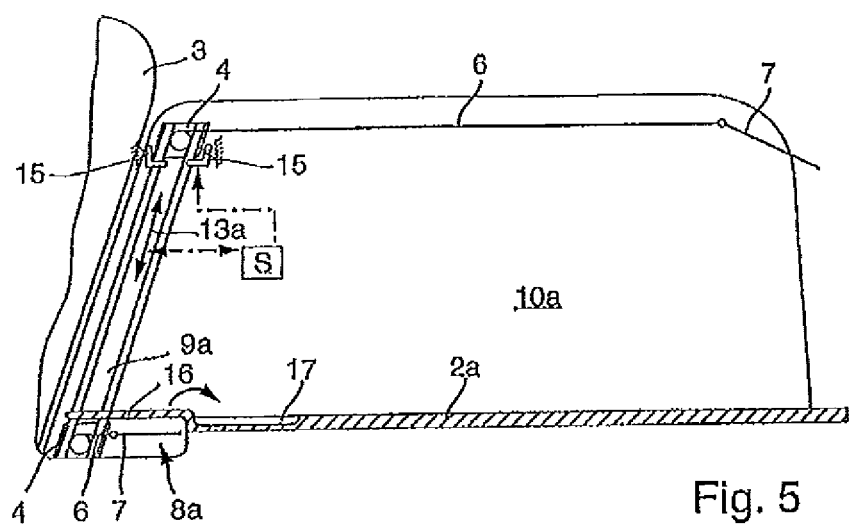
FIG. 5 is a schematic sectioned side view of another embodiment of a protection device according to the invention, in the form of a storage space cover.

In the embodiment according to FIG. 5, there is also provided a storage space cover which substantially corresponds to the storage space cover according to FIGS. 1 to 4. Components which are identical and which have the same function are given the same reference numerals, in some cases with the addition of the letter a. The differences of the storage space cover according to FIG. 5 will substantially be discussed below. Furthermore, reference will be made to the disclosure with respect to the embodiment according to FIGS. 1 to 4. The cartridge housing 4, in which the covering tarpaulin 6 is supported so as to be able to be wound and unwound, as in the embodiment according to FIGS. 1 to 4, is retained in vehicle-side retention receiving members which are guided in opposing linear guides 9a which are secured to the vehicle so as to be able to be moved in a linear manner between an upper protection position and a lower rest position. The substantial difference in the embodiment according to FIG. 5 is that the retention receiving members in the linear guides 9a are displaced by means of a drive device which is provided with an electric motor, there being laid in the opposing linear guides 9a of the side walls 10a drive transmission cables 13a which are constructed as flexible shafts. The drive transmission cables are securely connected by means of carriers to the retention receiving members for the cartridge housing 4. In order to displace the drive transmission cables in the linear guides 9a, there is provided a toothed wheel gear which is controlled by the electric motor and which displaces in a synchronized manner both drive transmission cables in the opposing linear guides 9a at the same time by identical amounts. A control unit S controls the electric motor in order to bring about a corresponding lifting or lowering movement of the retention receiving members and consequently the cartridge housing 4 relative to the linear guides 9a.

In order to achieve in the protection position of the cartridge housing 4 slightly below a side wall bodywork member a secure fixing of the cartridge housing 4 in the event of a crash, there is associated in each case with the opposing retention receiving members for the cartridge housing 4 a locking mechanism 15 which secures the cartridge housing 4 and the retention receiving members in the protection position according to FIG. 5. The locking mechanism 15 is controlled by the control unit S in such a manner that the locking mechanism 15 is released before the drive transmission cables displace the retention receiving members and the cartridge housing 4 downwards from the protection position. In a correspondingly transposed manner, the cartridge housing 4 and the associated retention receiving members can be secured during an upward lifting movement by closure of the locking mechanism 15 as soon as the cartridge housing 4 and the retention receiving members have reached the upper protection position. This closure is also controlled by the control unit S. Corresponding control operations are shown by the dot-dash arrows according to FIG. 5. There is additionally associated with the drive transmission cables or the linear guides 9a a sensor system which detects positions of the retention receiving members and the cartridge housing 4 and transmits corresponding messages to the control unit S in order to be able to initiate suitable control operations.

The storage-space-base-side recess 8a in the front region of the storage space base 2a and directly adjacent to the backrest arrangement 3 of the bench type rear seat is sized in such a manner that, in addition to receiving the cartridge housing 4, the dimensionally stable contour portion 7 can also be received in the recess 8a. The recess 8a is additionally provided with a cover 16 which closes the recess 8a in a flush manner with the storage space base 2a where applicable. The cover 16 is supported so as to be pivotably movable about a vehicle transverse axis on the storage space base 2a. There is associated with the cover 16 in the storage space base 2a behind the recess 8a a shallow indentation 17, in which the cover 16 in an open position can be deposited in a manner flush with the storage space base, in which position the recess 8a is released.

With reference to FIGS. 6 to 13, various drive devices for use with a protection device according to FIGS. 1 to 5 are illustrated and are provided for vertical displacement of the carrier arrangement 4 for the winding shaft for support of the flexible planar formation so as to be able to be wound and unwound. In the embodiment according to FIG. 6, for vertical displacement of the retention receiving members 12 for the carrier arrangement, that is to say, the cartridge housing 4, two flexible shafts 18 are provided as tensile/pressure strands which are driven by an electric motor M. In this instance, the electric motor M directly drives only the flexible shaft 18 which is illustrated on the left in FIG. 6 and which is coupled to one of the two retention receiving members 12 for the carrier arrangement, that is to say, the cartridge housing 4. As a result of a longitudinal displacement of the flexible shaft 18, the retention receiving member 12 is necessarily carried and the cartridge housing 4 is thus displaced. The drive device has a second flexible shaft 18 which is coupled parallel with the first flexible shaft 18 to the opposing retention receiving member 12. By means of a synchronization shaft 19, the two flexible shafts 18 are connected to each other mechanically so as to transmit movement so that a drive movement of the electric motor M for the flexible shaft 18 on the left in FIG. 6 necessarily carries out a transmission of the drive movement by means of the synchronization shaft 19 to the right-hand flexible shaft 18 in FIG. 6. The retention receiving members 12 and the cartridge housing 4 are thereby displaced in a parallel manner along corresponding guide rails within the storage space. Each flexible shaft 18 has in a manner known in principle a helical outer contour which enables corresponding movement transmissions to associated transmission pinions of the synchronization shaft 19.

Figure 7:
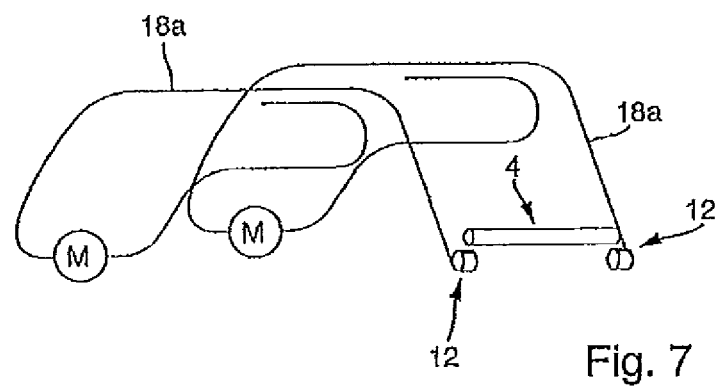
FIG. 7 shows another embodiment of a drive device similar to FIG. 6.

In the embodiment according to FIG. 7, the drive device is also provided with two flexible shafts 18a which extend parallel with each other and which act on one of the two retention receiving members 12 of the cartridge housing 4. In this embodiment, however, a separate electric motor M is associated with each flexible shaft 18a, respectively. The two electric motors M are controlled in a synchronous manner not illustrated in greater detail by means of electrical or electronic synchronization means so that simultaneous and synchronous movements of the two flexible shafts 18a are achieved.

Figure 8:
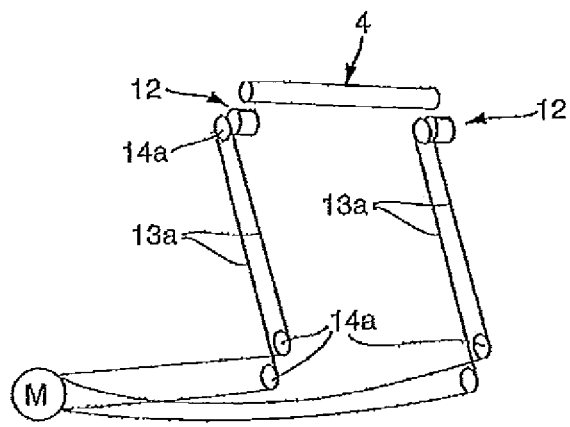
FIG. 8 shows another embodiment of a drive device having a cable arrangement similar to FIG. 4.

In the embodiment according to FIG. 8, which includes the protection device with the cartridge housing 4 and the retention receiving members 12, has a peripheral cable arrangement in accordance with the embodiment previously described with reference to FIG. 4. The significant difference in the drive transmission system according to FIG. 8 is that there is integrated in the cable arrangement 13a, 14a an electric motor M which brings about a displacement of the peripheral cable. The electric motor may be arranged so as to be concealed in a side bodywork member of the storage space or at another location in the storage space behind a corresponding storage space trim.

Figure 9:
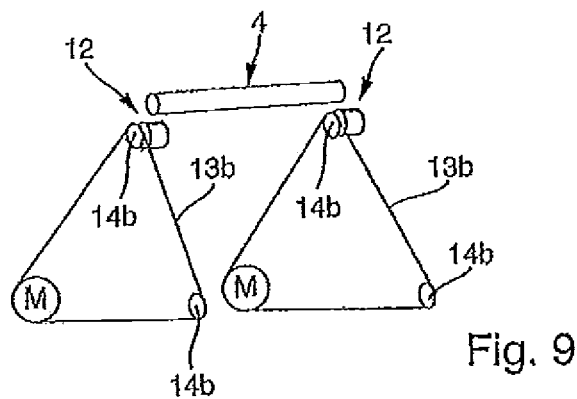
FIG. 9 shows another embodiment of a drive device for displacing the cartridge housing of a protection device according to FIGS. 1 to 5.

In the embodiment according to FIG. 9, a parallel displacement of the cartridge housing 4 and the retention receiving members 12 is not carried out by means of a single cable arrangement but instead by means of two cable arrangements 13b, 14b which are arranged at opposing sides parallel with each other. Each of the two cable arrangements 13b, 14b is constructed so as to extend in a triangular manner and is driven by means of an electric motor M which is effective in the region of a redirection roller of the respective cable arrangement 13b, 14b. The two electric motors M may be accommodated in opposing side bodywork members of the storage space.

Figure 10:
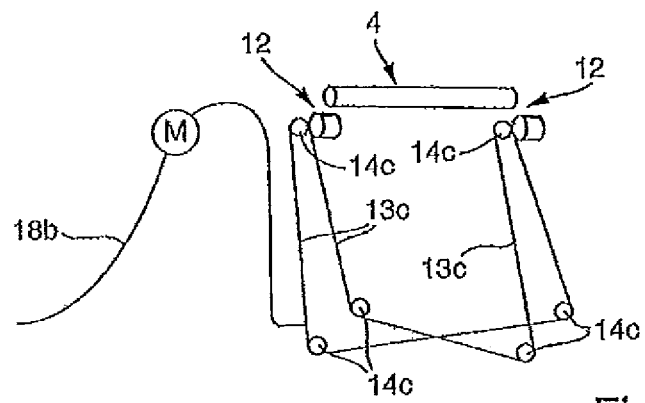
FIG. 10 shows another embodiment of a drive device similar to FIG. 8.

In the embodiment according to FIG. 10, there is provided a peripheral cable arrangement 13c, 14c similar to the embodiment according to FIG. 4 or the embodiment according to FIG. 8 with the difference that in this instance an electric motor M engages on the corresponding cable 13c by means of a flexible shaft 18b in order to move it in the longitudinal direction of the corresponding cable strand. Both the flexible shaft 18b and the electric motor M may be arranged so as to be concealed behind a corresponding storage space trim component.

Figure 6:
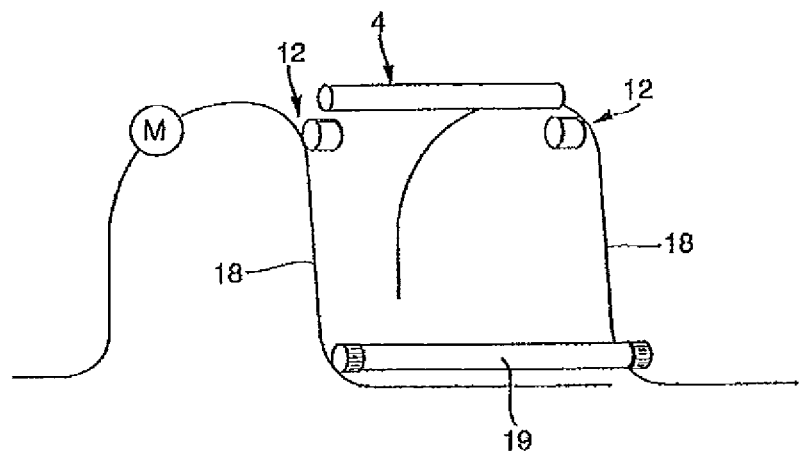
FIG. 6 is a schematic illustration of a first embodiment of a drive device for displacing the cartridge housing of the protection device according to FIGS. 1 to 5.
Figure 11:
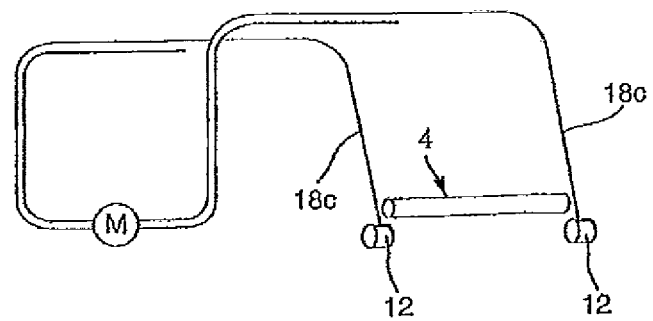
FIG. 11 shows another embodiment of a drive device for displacing the cartridge housing similar to FIGS. 6 and 7.

The drive device according to FIG. 11 has in a similar manner to the embodiments according to FIGS. 6 and 7 two flexible shafts 18c which are associated with the opposing retention receiving members 12 for the cartridge housing 4. The two flexible shafts intersect each other in the region of a central electric motor M, which drives both flexible shafts 18c by means of a corresponding gear arrangement in the same direction in such a manner that both flexible shafts 18c are displaced in the same direction by identical amounts.

Figure 12:
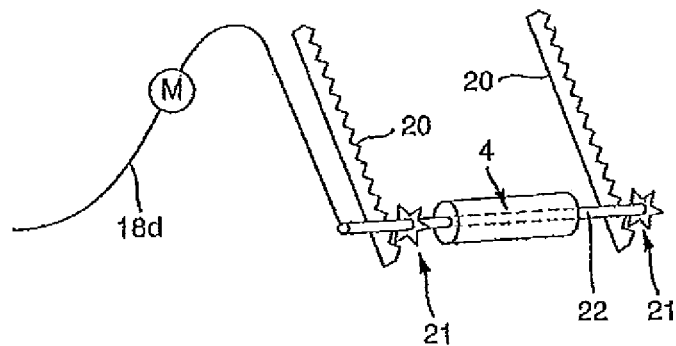
FIG. 12 shows another embodiment of a drive device for displacing the cartridge housing.

The drive device according to FIG. 12 comprises a carrier arrangement 4 for a winding shaft of a flexible planar formation, through which there extends coaxially a synchronization shaft 22 which meshes at opposing front end regions by means of a toothed pinion 21 with a toothed rod or a toothed rail 20, respectively. The two toothed rods 20 are arranged parallel with each other along the displacement plane for the carrier arrangement 4 in the vehicle interior or in the storage space. A flexible shaft 18d engages on the synchronization shaft 22 in order to vertically displace it along the toothed rods 20. An electric motor M is associated with the flexible shaft 18d as a corresponding displacement drive.

Figure 13:
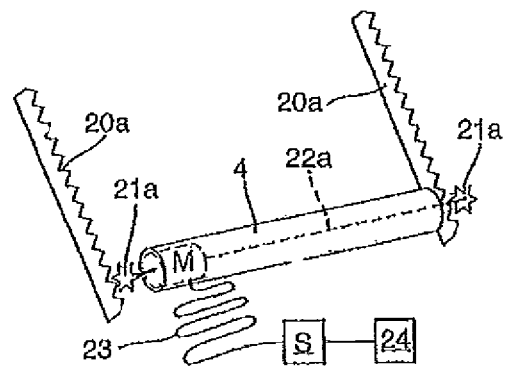
FIG. 13 shows a last embodiment of a drive device for displacing the cartridge housing within a storage space.

In the embodiment according to FIG. 13, the drive device comprises an electric motor M which is integrated in the carrier arrangement 4, preferably coaxially relative to a corresponding synchronization shaft 22a. The electric motor M is therefore vertically displaced, together with the carrier arrangement 4, along corresponding toothed rails 20a which may be constructed as toothed rods. The electric motor M acts on the synchronization shaft 22a and the toothed pinion 21a which is rotationally secured to the synchronization shaft 22a, whereby they roll along the corresponding toothed strip 20a and consequently displace the carrier arrangement 4 along the toothed rail 20a in an upward or downward direction. For power supply, and to control the electric motor M, there is associated with the electric motor M in the embodiment according to FIG. 13 a trailing cable 23 which is connected to an electronic control unit S and an energy supply source 24. In place of a trailing cable, sliding contacts may also be provided in order to control and to supply electrical power to the electric motor M.

The invention claimed is:

1. A protection device for a storage space of a motor vehicle, having a carrier arrangement including at least one flexible planar formation supported so as to be able to be wound and unwound, the carrier arrangement being positioned so as to be secured to the storage space in vehicle-side retention receiving members, the retention receiving members being displaceable inside the storage space by a kinematic displacement system, the kinematic displacement system having opposing vehicle-side linear guides extending with a main direction component in a substantially vertical direction of the vehicle and in which vehicle-side linear guides the retention receiving members are guided, and a storage-space-base-side recess in which storage-space-base-side recess the carrier arrangement is arranged in a recessed manner in a rest position, the vehicle-side linear guides being provided in opposing side wall regions of the storage space and extending between an upper end region of the storage space adjacent a side wall bodywork member and the storage-space-base-side recess at a base of the storage space, the protection device further including a mechanical synchronization system disposed to displace the retention receiving members along the respective vehicle-side linear guides in a synchronous manner such that the carrier arrangement maintains a horizontal orientation when raised or lowered, said mechanical synchronization system including a drive device to raise or lower the carrier arrangement in the vehicle-side linear guides, a control unit which controls the drive device and a locking mechanism securing the carrier arrangement relative to the side wall regions of the storage space, the control unit, depending on a control of the drive device, releasing or locking the locking mechanism.

2. The protection device as claimed in claim 1, wherein the vehicle-side linear guides extend parallel with each other and have, in addition to the orientation in the substantially vertical direction of the vehicle, an inclination component in a longitudinal direction of the vehicle.

3. The protection device as claimed in claim 1, wherein the mechanical synchronization system has a single peripheral cable arrangement for a synchronous vertical displacement of both retention receiving members in the vehicle-side linear guides.

4. The protection device as claimed in claim 1, further including a cover arranged to close the storage-space-base-side recess in a manner so that the cover is flush with the base.

5. The protection device as claimed in claim 1, wherein the drive device comprises at least one electric motor and a mechanical drive transmission system which is operationally connected to the at least one electric motor and to the carrier arrangement.

6. The protection device as claimed in claim 5, wherein the mechanical drive transmission system comprises at least one elongate flexible tensile and/or pressure strand.

7. The protection device as claimed in claim 6, wherein the tensile and/or pressure strand is constructed as a peripheral closed annular strand.

8. The protection device as claimed in claim 1, wherein the mechanical synchronization system is separate from the carrier arrangement and includes at least one element which directly interconnects the retention receiving members to one another to cause synchronous displacement of the retention receiving members along and relative to the vehicle-side linear guides during movement of the carrier arrangement into at least one of a raised position and the rest position.

9. A protection device for a storage space of a motor vehicle, having a carrier arrangement including at least one flexible planar formation supported so as to be able to be wound and unwound, the carrier arrangement being positioned so as to be secured to the storage space in vehicle-side retention receiving members, the retention receiving members being displaceable inside the storage space by a kinematic displacement system, the kinematic displacement system having opposing vehicle-side linear guides extending with a main direction component in a substantially vertical direction of the vehicle and in which vehicle-side linear guides the retention receiving members are guided, and a storage-space-base-side recess in which storage-space-base-side recess the carrier arrangement is arranged in a recessed manner in a rest position, the vehicle-side linear guides being provided in opposing side wall regions of the storage space and extending between an upper end region of the storage space adjacent a side wall bodywork member and the storage-space-base-side recess at a base of the storage space, the protection device further including a mechanical synchronization system disposed to displace the retention receiving members along the respective vehicle-side linear guides in a synchronous manner such that the carrier arrangement maintains a horizontal orientation when raised or lowered, the mechanical synchronization system including a synchronization shaft extending through the carrier arrangement, a pair of sidewardly-spaced toothed rods disposed substantially vertically and adjacent the side wall regions, an electric motor operatively connected to the synchronization shaft, the synchronization shaft having opposite ends respectively mounting thereon toothed pinions engaged with the respective toothed rods, and the motor when actuated displacing the synchronization shaft to cause synchronous displacement of the retention receiving members along and relative to the vehicle-side linear guides during movement of the carrier arrangement into at least one of a raised position and the rest position, and the mechanical synchronization system further including a flexible shaft engaged with the synchronization shaft and operatively connecting the synchronization shaft to the motor.

10. A protection device for a storage space of a motor vehicle, having a carrier arrangement including at least one flexible planar formation supported so as to be able to be wound and unwound, the carrier arrangement being positioned so as to be secured to the storage space in vehicle-side retention receiving members, the retention receiving members being displaceable inside the storage space by a kinematic displacement system, the kinematic displacement system having opposing vehicle-side linear guides extending with a main direction component in a substantially vertical direction of the vehicle and in which vehicle-side linear guides the retention receiving members are guided, and a storage-space-base-side recess in which storage-space-base-side recess the carrier arrangement is arranged in a recessed manner in a rest position, the vehicle-side linear guides being provided in opposing side wall regions of the storage space and extending between an upper end region of the storage space adjacent a side wall bodywork member and the storage-space-base-side recess at a base of the storage space, the protection device further including a mechanical synchronization system disposed to displace the retention receiving members along the respective vehicle-side linear guides in a synchronous manner such that the carrier arrangement maintains a horizontal orientation when raised or lowered, the mechanical synchronization system including a synchronization shaft extending through the carrier arrangement, a pair of sidewardly-spaced toothed rods disposed substantially vertically and adjacent the side wall regions, an electric motor operatively connected to the synchronization shaft, the synchronization shaft having opposite ends respectively mounting thereon toothed pinions engaged with the respective toothed rods, and the motor when actuated displacing the synchronization shaft to cause synchronous displacement of the retention receiving members along and relative to the vehicle-side linear guides during movement of the carrier arrangement into at least one of a raised position and the rest position, and the motor is provided on the carrier arrangement and drivingly engaged with the synchronization shaft.

11. A protection device for a storage space of a motor vehicle, the protection device including a carrier arrangement in which at least one flexible planar formation is supported so as to be able to be wound and unwound, wherein the carrier arrangement is able to be positioned so as to be secured to the storage space in vehicle-side retention receiving members, wherein the retention receiving members can be displaced inside the storage space by a kinematic displacement system, wherein the kinematic displacement system has vehicle-side linear guides which extend with a main direction component in a substantially vertical direction of the vehicle and in which the retention receiving members are guided, a storage-space-base-side recess in which the carrier arrangement is arranged in a recessed manner in a rest position, the vehicle-side linear guides being provided in opposing side wall regions of the storage space and extending between an upper end region of the storage space adjacent a side wall bodywork member and the storage-space-base-side recess at a base of the storage space, a drive device which raises or lowers the carrier arrangement in the vehicle-side linear guides, wherein, at least for an operating position of the carrier arrangement and the retention receiving members, there is provided a locking mechanism which secures the carrier arrangement relative to the side wall regions of the storage space so as to be secure in the event of a crash, and a control unit which controls the drive device and which, depending on a control of the drive device, brings about release or locking of the locking mechanism.

12. A protection device for a storage space of a motor vehicle, said protection device comprising:
a pair of linear guides disposed in sidewardly spaced relation from one another along opposed side wall regions of the storage space and extending substantially vertically between an upper end region of the storage space and a lower end region of the storage space;
a pair of receiving members, each said receiving member being movably mounted in one of said linear guides;
a carrier arrangement including a housing, said housing including a pair of retention elements located at respective opposite ends of said housing in sidewardly spaced relation from one another, each said retention element being mounted on one of said receiving members to secure said carrier arrangement in the storage space, said carrier arrangement being mounted for movement within the storage space upon displacement of said receiving members into a raised position of said carrier arrangement wherein said carrier arrangement is located adjacent the upper end region of the storage space and a lowered position of said carrier arrangement wherein said carrier arrangement is located adjacent the lower end region of the storage space;
a flexible and substantially planar cover connected to said housing and being movable into a wound configuration wherein said cover is located at least partially within said housing and an unwound configuration wherein said cover is at least partially extended from said housing into a protective position so as to be disposed over at least part of the storage space;
a mechanical synchronization arrangement separate from said carrier arrangement and said housing thereof and including an elongate cable in the form of a closed loop directly connected to and extending between said receiving members to cause synchronous displacement of said receiving members along and relative to the respective said linear guides during movement of said carrier arrangement into at least one of the raised position and the lowered position;
a base defining a lower extent of the storage space, said base defining therein a recess in which said carrier arrangement is disposed when in the lowered position, the storage space having an upwardly-opening U shape defined by said side wall regions and said base; and
a plurality of rollers disposed along said side wall regions and said base, said loop being guided on said rollers.

13. The protection device as claimed in claim 12, said mechanical synchronization arrangement further including an electric motor operatively connected to said loop, said motor when actuated displacing said loop to cause synchronous displacement of said receiving members along and relative to said linear guides during movement of said carrier arrangement into at least one of the raised position and the lowered position.

14. A protection device for a storage space of a motor vehicle, said protection device comprising:
a pair of linear guides disposed in sidewardly spaced relation from one another along opposed side wall regions of the storage space and extending substantially vertically between an upper end region of the storage space and a lower end region of the storage space;
a pair of receiving members, each said receiving member being movably mounted in one of said linear guides;
a carrier arrangement including a housing, said housing including a pair of retention elements located at respective opposite ends of said housing in sidewardly spaced relation from one another, each said retention element being mounted on one of said receiving members to secure said carrier arrangement in the storage space, said carrier arrangement being mounted for movement within the storage space upon displacement of said receiving members into a raised position of said carrier arrangement wherein said carrier arrangement is located adjacent the upper end region of the storage space and a lowered position of said carrier arrangement wherein said carrier arrangement is located adjacent the lower end region of the storage space;
a flexible and substantially planar cover connected to said housing and being movable into a wound configuration wherein said cover is located at least partially within said housing and an unwound configuration wherein said cover is at least partially extended from said housing into a protective position so as to be disposed over at least part of the storage space;
a mechanical synchronization arrangement separate from said carrier arrangement and said housing thereof and including a pair of flexible drive shafts disposed to directly interconnect said receiving members to one another, and an electric motor operatively connected to said drive shafts, said motor when actuated displacing said drive shafts to cause synchronous displacement of said receiving members along and relative to said linear guides during movement of said carrier arrangement into at least one of the raised position and the lowered position; and
a base defining a lower extent of the storage space, said base defining therein a recess in which said carrier arrangement is disposed when in the lowered position.

15. The protection device as claimed in claim 14, wherein said motor directly drives only one of said drive shafts and said mechanical synchronization arrangement includes a synchronization shaft disposed to mechanically interconnect said drive shafts to one another such that said motor when actuated displaces said one drive shaft and said synchronization shaft transmits a corresponding displacement to the other of said drive shafts to cause synchronous displacement of said receiving members along and relative to said linear guides during movement of said carrier arrangement into at least one of the raised position and the lowered position.

* * * * *